US008293314B2

(12) United States Patent
Brüse et al.

(10) Patent No.: US 8,293,314 B2
(45) Date of Patent: Oct. 23, 2012

(54) CHOCOLATE COMPOSITION

(75) Inventors: Falk Brüse, Ascheberg (DE); Joël René Pierre Wallecan, Evere (BE); Carmen Silvia Arruda, São Paulo (BR)

(73) Assignee: Cargill, Incorporated, Wayazata, MN (US)

(*) Notice: Subject to any disclaimer, the term of this patent is extended or adjusted under 35 U.S.C. 154(b) by 696 days.

(21) Appl. No.: 12/048,581

(22) Filed: Mar. 14, 2008

(65) Prior Publication Data
US 2008/0248186 A1    Oct. 9, 2008

(30) Foreign Application Priority Data
Mar. 16, 2007  (EP) .................... 07005496

(51) Int. Cl.
A23G 1/04    (2006.01)
A23D 9/013   (2006.01)

(52) U.S. Cl. ................ 426/631; 426/610
(58) Field of Classification Search ........... 426/631, 426/601, 610, 615
See application file for complete search history.

(56) References Cited

U.S. PATENT DOCUMENTS

| 2,336,346 A | 12/1943 | Carver |
| 4,364,868 A | 12/1982 | Hargreaves |
| 5,023,102 A | 6/1991 | Given, Jr. |

FOREIGN PATENT DOCUMENTS

| EP | 0 023 062 | 1/1981 |
| EP | 0 199 580 | 10/1986 |
| EP | 0 393 327 | 10/1990 |
| EP | 0 496 310 | 7/1992 |
| EP | 0 637 420 | 2/1995 |
| EP | 1 491 097 A1 | 12/2004 |
| GB | 990 034 | 4/1965 |
| GB | 1102944 | 2/1968 |
| WO | WO 91/14376 | 10/1991 |
| WO | WO 2006/056401 | 6/2006 |

OTHER PUBLICATIONS

Ainsworth, S. et al. "Enzymatic interesterification of fats." 1996, Milkfat Update Conference, vol. 51, p. 105-107.*

* cited by examiner

Primary Examiner — D. Lawrence Tarazano
Assistant Examiner — Katherine Deguire

(57) ABSTRACT

A chocolate composition having a fat phase, characterized in that said fat phase:
  has a slip melting point of at least 27.5° C., preferably of between 30 and 37° C.; and
  comprises both modified and unmodified fats, wherein said modified fats comprise an interesterified fat consisting of interesterified cocoa butter.

21 Claims, 4 Drawing Sheets

1 = 1st ring mark
2 = 2nd ring mark; sample of [a]
3 = thermometer bulb
4 = thermometer 1 = 1st ring mark
2 = 2nd ring mark; sample of [a']
3 = thermometer bulb
4 = thermometer

| Start | 31°C | 32°C | 33°C |
|---|---|---|---|
|  |  |  |  |

Heat resistant cocoa butter chocolate

|  |  |  |  |
|---|---|---|---|

Ivory coast cocoa butter chocolate

|  |  |  |  |
|---|---|---|---|

Brazilian cocoa butter chocolate

CHOCOLATE COMPOSITION

FIELD OF THE INVENTION

The present invention relates to an improved chocolate composition. In particular, it relates to chocolate compositions having improved heat stability and bloom-resistance, to methods of producing such compositions and to products produced therefrom.

BACKGROUND OF THE INVENTION

When subjected to even only relatively warm temperatures (i.e. in hot weather) chocolate products—whether in the form of bars, tablets, coatings or other—tend to loose their desired character and shape, to become soft, unsatisfactory and sticky to handle and to loose their gloss (due to leaching of their fat constituents and to both the fats and sugars recrystallising at the surface—known as "blooming"). In particular, if wrapped, the chocolate product will adhere to its packaging and its surface will be marred when the wrapper is removed.

In its simplest form, chocolate is produced by grinding a mixture of cocoa liquor, sugar and milk solids (in the case of milk chocolate) to a desired degree of fineness before incorporating a certain amount of cocoa butter. The mixture is then placed in a so-called conching machine (or conge-mixer) in which it is agitated or "worked", providing aeration that allows certain undesired aromas to escape and helping the final chocolate flavour to develop. During this step, also referred to as "finishing", the sugar and milk solids become completely coated with fat. The resulting paste is finally tempered and either formed into a product for sale or stored for subsequent use.

Cocoa butter is responsible for some of the most important properties of the chocolate product. These properties include its sensory qualities (mouth feel and snap, for instance), its physical behaviour (hardness and shape retention) and its tendency to bloom. Bloom behaviour, in particular, is difficult to predict since its specific causes and mechanisms still remain largely unknown.

Conventional chocolate products tend to soften and melt between 30° C. and 35° C.—or even at lower temperatures depending on the nature and amount of cocoa butter used in the final composition.

Various processes have been proposed in order to provide chocolate products with higher temperature stability. These include:
- replacing some or all of the cocoa butter with fats from non-cocoa sources which have higher melting points (e.g. cocoa butter improvers, cocoa butter replacers, cocoa butter substitutes and cocoa butter equivalents), and
- adding a non-fat based structuring additive (or framing structure) to the chocolate composition.

Unfortunately, the resulting products very often have an unpleasant taste, a less smooth mouth-feel and a perceptibly coarser and more brittle texture in comparison to conventional chocolate products (cf. EP-A-0 393 327, EP-A-0 637 420). Commercially, there is also a disincentive to using "additives" which have to be listed in the ingredients (as is the case, for example, for some cocoa butter replacers). There is therefore a clear need in the art for improved chocolate products which are comparable, from a sensory point of view, to high quality chocolate and which have improved heat and bloom resistance.

STATEMENTS OF THE INVENTION

According to a first aspect of the present invention, there is provided a chocolate composition having a fat phase, wherein said fat phase:
- has a slip melting point of at least 27.5° C., preferably of between 30 and 37° C.; and
- comprises both modified and unmodified fats, wherein said modified fats comprise an interesterified fat consisting of interesterified cocoa butter.

According to a further aspect of the present invention, there is provided a process for the manufacture of a chocolate composition comprising adding a fat composition to a cocoa mass, wherein the fat composition comprises at least one modified fat, said at least one modified fat comprising an interesterified fat consisting of interesterified cocoa butter having a slip melting point of 25° C. to 50° C.

According to a yet further aspect of the present invention, there is provided the use of an interesterified cocoa butter to improve the heat stability of a chocolate composition relative to a chocolate composition prepared with only unmodified cocoa butter.

Finally, according to yet another aspect of the present invention, there is provided the use of an interesterified cocoa butter to improve the bloom stability of a chocolate composition relative to a chocolate composition prepared with only unmodified cocoa butter.

DETAILED DESCRIPTION OF THE INVENTION

Figure 1:
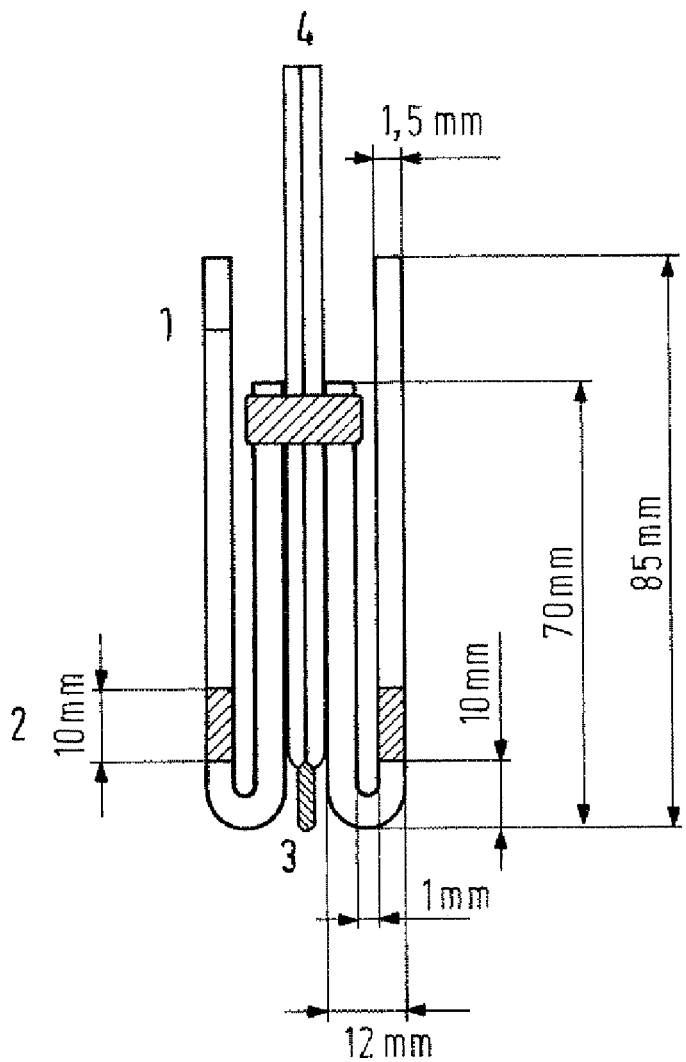
FIG. 1: U-tube configuration for melting point determination (according to Method 1)

The present invention is based on the finding that an improved chocolate composition can be obtained by replacing at least some of the cocoa butter content of a standard chocolate composition with interesterified cocoa butter. In particular, it has been found that such a composition has improved heat stability and bloom resistance together with improved sensory properties such as mouth feel compared to products currently on the market.

The terms "chocolate" and "chocolate composition" can be used interchangeably. They typically refer to mixtures of cocoa liquor and/or cocoa powder, cocoa butter and/or cocoa butter replacers, equivalents, improvers, and/or substitutes, sugar and/or sugar replacers plus one or more optional ingredients such as emulsifiers, milk solids, milk fats, nuts, nut pastes and flavouring agents. They should not be interpreted as being limited to any particular legal definition of chocolate under certain national regulations. The cocoa butter and other fatty constituents of the chocolate composition will be referred to herein as the "fat phase".

The fat phase will have a slip melting point of at least 27.5° C., preferably of between 30 and 37° C. and will include both modified and unmodified fats (with "fat" being used here to refer to both fats and oils). A modified fat is a fat whose chemical structure or composition has been changed by some chemical, enzymatic and/or mechanical means. An unmodified fat is a fat that still has its original, natural chemical structure and composition, though it may have been extracted/pressed and cleaned or purified.

Modified Fats

The modified fats comprised in the present invention will include interesterified fats consisting of interesterified cocoa butter. In other words, the composition will not include any interesterified fats other than interesterified cocoa butter. It may contain other types of modified fats such modified cocoa butter equivalents (palm oil, illipe oil, shea butter, mango kernel oil, etc.) or anti-bloom fats (such as 1-3 dibehynoyl-2-oleoyl glycerol). Preferably however, the interesterified cocoa butter will be the only modified fat included in the composition.

Interesterification may be carried out by any conventional chemical or enzymatic interesterification process. Where an enzymatic process is used, suitable enzymes will be apparent to a person skilled in the art but will preferably be selected from lipase enzymes. Advantageously, the enzymes wilt be immobilised. They will typically be used in an amount of 0.01-10%, preferably in an amount of 0.05-5% by weight immobilised enzyme relative to the total weight of cocoa butter.

The interesterified cocoa butter may be completely or partially interesterified. Partially interesterified cocoa butter is a cocoa butter which has not been allowed to react to achieve its fully converted state for a given set of reaction conditions.

According to one possible embodiment, the cocoa butter will be interesterified by so-called "directed" interesterification. Directed interesterification is carried out at a temperature which allows certain components of the cocoa butter to crystallize. This shifts the equilibrium of the process and therefore results in slightly different products. Without wishing to be bound by theory, it is believed that modified cocoa butters obtained by directed interesterification will have improved sensory properties, a higher melting point and health benefits relative to modified cocoa butters obtained by other methods.

The interesterification step may be followed by one or more fractionation steps. Fractionation is typically used to separate components of an oil or fat having different physical properties. In particular, it is used to isolate stearins (which are solid) from oleins (which are liquid). By removing oleins from the interesterified cocoa butter, its melting point will be further increased relative to a corresponding unmodified cocoa butter.

Fractionation methods are well known to those skilled in the art and include, for example, dry fractionation and solvent fractionation (e.g. $CO_2$ fractionation). For the purpose of the present invention, the cocoa butter will preferably be fractionated by dry fractionation.

After the interesterification and optional fractionation steps, the modified cocoa butter of the present invention will preferably have a melting point of 25° C. to 50° C., more preferably of 30° C. to 45° C., even more preferably of 35° C. to 40° C., when measured according to the slip melting point method set out below (see Method 1). By way of comparison, the slip melting point of unmodified cocoa butter will typically vary from 24° C. to about 32° C.

Unmodified Fats

The chocolate composition of the present invention will include both modified and unmodified fats. Indeed, the composition will always include a certain amount of unmodified cocoa butter. In the case of milk chocolate compositions, it will also typically include milk fat. Milk fat is generally used in the form of anhydrous milk fat or butter oil. Examples of other unmodified fats suitable for use in the present invention will be apparent to the skilled person and can include well-known cocoa butter equivalents, cocoa butter improvers, cocoa butter replacers, cocoa butter substitutes, and the fatty constituents of other ingredients such as hazelnut paste, for instance. Preferably, the unmodified fats will consist of cocoa butter and milk fat or of cocoa butter on its own.

Thus, according to a most preferred embodiment of the present invention, there is provided a chocolate composition having a fat phase consisting of interesterified cocoa butter (which may also be fractionated), unmodified cocoa butter and, optionally, milk fat.

The unmodified cocoa butter and interesterified cocoa butter will preferably be present in a weight ratio of 3:1 and should ideally account for 80 to 100% by weight of the total fat phase.

More specifically, the fat phase will preferably comprise:
  from 1 to 30%, preferably from 5 to 20%, by weight interesterified cocoa butter;
  from 45 to 99%, preferably from 70 to 95%, by weight unmodified cocoa butter; and
  from 0 to 20%, preferably from 0 to 5%, by weight milk fat.

These ranges represent typical fat ranges for dark and milk chocolate. However, compositions of the present invention can also be used for the production of white chocolate and other chocolate products. The above ranges should not be construed as limiting for such applications.

The chocolate composition of the present invention can be produced by any conventional method known to the skilled person. As described in the Background section of this specification, chocolate is traditionally produced by mixing a cocoa liquor with sugar and milk solids (in the case of milk chocolate) to form a cocoa mass, then adding cocoa butter and eventually lecithin and tempering until the desired characteristics of the end product are achieved. As would be expected, this method will be adapted according to the type of chocolate to be produced (e.g. white chocolate, enrobing chocolate, etc.). Compositions of the present invention can be produced using a process similar to any of these conventional methods. If only interesterified cocoa butter is being added, it may simply be mixed with the cocoa mass instead of the unmodified cocoa butter. If more than one type of fat is being added (e.g. a mixture of modified and unmodified cocoa butter), they can be pre-mixed or introduced separately, in any order. If milk fat is to be used, it can either be added with, or separately from, the other milk solids. For clarity, and to avoid confusion with the term "fat phase" (which includes cocoa butter from the cocoa liquor as well as added fats), the sum of fats added to the liquor will be referred to herein as the "fat composition".

Of course, other ingredients may be added, either on top of or instead of those listed above, depending on the desired end use of the chocolate composition (and always with the proviso that the fat phase should remain in accordance with the invention). For example, it may be desirable to add flavouring agents or to replace some or all of the sugar with an artificial sweetener. Other possible modifications to the above process will be apparent to the skilled person and need not be listed here. Interestingly, because products made with the composition of this invention have improved bloom resistance, it may be possible to ease the normally critical tempering requirements or, even, to skip tempering altogether.

The resulting chocolate composition can either be stored or used directly, e.g. for the manufacture of tablets or bars or to produce, by way of illustration only, coatings, moulded chocolates, chocolate centres, pralines, chocolate shapes, chocolate chips, chocolate fillings and chocolate for fondue. These products will have increased heat stability when compared to chocolate compositions prepared with only unmodified cocoa butter, i.e. they will have improved hardness, improved form stability and a better resistance to fat bloom. Advantageously, they will also have the same or better sensory properties (e.g. taste, creaminess and mouth-feel) than a standard chocolate product made with unmodified cocoa butter.

The present invention will now further be described by way of non-limiting examples.

EXAMPLES

Example 1

Enzymatic Interesterification of Cocoa Butter

Cocoa butter from Cargill South America was interesterified using Lipozyme TL IM (Novozymes).

5 kg cocoa butter was heated to 70° C. in a reaction vessel. 100 g enzyme (2%) were added and the mixture was stirred for 16 h at about 40 mbar. The product was isolated by filtration. During conversion, free fatty acid content increased from 2.1% to 2.4-2.7%. The melting point (measured using the slip melting point method set out below) was found to have increased from 26° C. to 42.5° C. already after only 6 h.

Example 2

Creaminess

A descriptive triangle test was performed to ISO standards. The tested chocolates were: two identical Cargill African milk chocolate references and one chocolate produced with an interesterified cocoa butter. The cocoa butter used in all the chocolates and for interesterification was of the same origin. The compositions of these chocolates is set out in Table 1.

TABLE 1

| Ingredients (%) | Reference | Blend |
|---|---|---|
| Sugar | 40.09 | 40.09 |
| Cocoa butter (deodorised - African) | 27.82 | 21.23 |
| Interesterified cocoa butter | 0 | 6.60 |
| Full cream milk powder (26% fat) | 13.30 | 13.30 |
| Cocoa liquor (African) | 9.54 | 9.54 |
| Lactose | 4.59 | 4.59 |
| Whey powder | 4.13 | 4.13 |
| Soya lecithin | 0.53 | 0.53 |
| Natural vanilla | Trace | trace |
| Total Fat | 37.02 | 37.02 |

14 panelists were asked about their preference and a set of descriptors (including creamy mouthfeel, melting rate and break strength) was given from which they were asked to chose the most dominant one. Preference was asked for on the basis of appearance, odor, firmness and taste.

13 of the 14 panelists were able to identify the different sample and preferred it for its smoothness, creaminess and softness.

Example 3

Bloom

Three chocolate samples were prepared:
one with South American cocoa butter and cocoa liquor (South American reference);
one with African cocoa butter and cocoa liquor (African reference); and
one prepared with a blend of South American unmodified cocoa butter and interesterified cocoa butter blend (prepared according to Example 1).

The compositions of the samples is set out in Table 2.

TABLE 2

| Ingredients (%) | Reference (South American/ African) | Blend (South American) |
|---|---|---|
| Sugar | 46.0 | 46.0 |
| Cocoa butter (deodorised) | 23.6 | 21.2 |
| Interesterified cocoa butter | 0 | 2.4 |
| Whole milk powder | 15.0 | 15.0 |
| Skim milk powder | 5.0 | 5.0 |
| Cocoa liquor | 10.0 | 10.0 |
| Soya lecithin | 0.4 | 0.4 |

Figure 3:
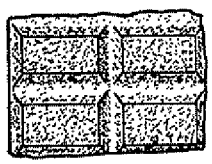
FIG. 3: Bloom results from Example 3
Figure 3:
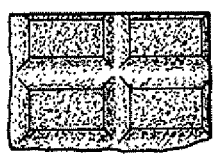
Figure 3:
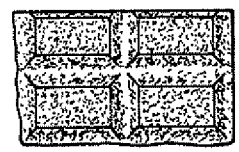
Figure 3:
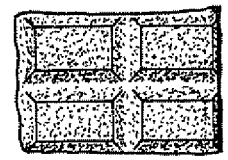
Figure 3:
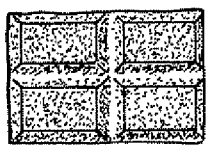
Figure 3:
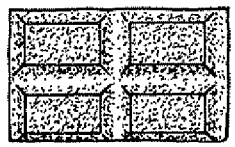
Figure 3:
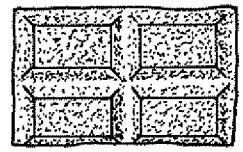
Figure 3:
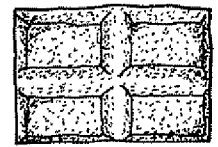
Figure 3:
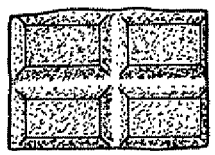
Figure 3:
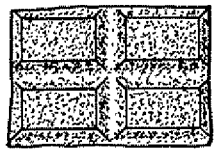
Figure 3:
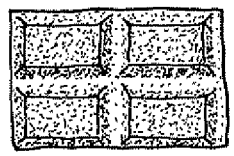
Figure 3:
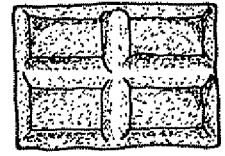

The samples were wrapped in aluminium foil and stored in a climate chamber. Temperature cycles of 19-31, 19-32 and 19-33° C. were applied with cycle times of about 6 hours. Relative humidity was kept constant at 40%. Chocolates were followed over a week for blooming and pictures were taken after 6 days. The results are shown in FIG. 3.

The reference chocolates start to bloom after the 2nd day using the 33° C. cycle and after 6 days with the 32° C. cycle. The chocolates that contained interesterified cocoa butter only showed small spots of bloom at the end of the 6th day. On the 32° C. cycle, chocolates that contained interesterified cocoa butter did not show any bloom after 6 days.

Example 4

Shape Retention

Samples of chocolate were cut into pieces of the same size. Each sample was placed in a glass dish and put in a climate chamber equilibrated at 30° C. and 40% relative humidity. The compositions of the samples is set out in Table 3.

TABLE 3

| Ingredients (%) | Reference | Blend |
|---|---|---|
| Sugar | 40.09 | 40.09 |
| Cocoa butter (deodorised - South American) | 27.82 | 21.23 |
| Interesterified cocoa butter | 0 | 6.60 |
| Full cream milk powder (26% fat) | 13.30 | 13.30 |
| Cocoa liquor (South American) | 9.54 | 9.54 |
| Lactose | 4.59 | 4.59 |
| Whey powder | 4.13 | 4.13 |
| Soya lecithin | 0.53 | 0.53 |
| Natural vanilla | Trace | trace |
| Total Fat | 37.02 | 37.02 |

Figure 4:
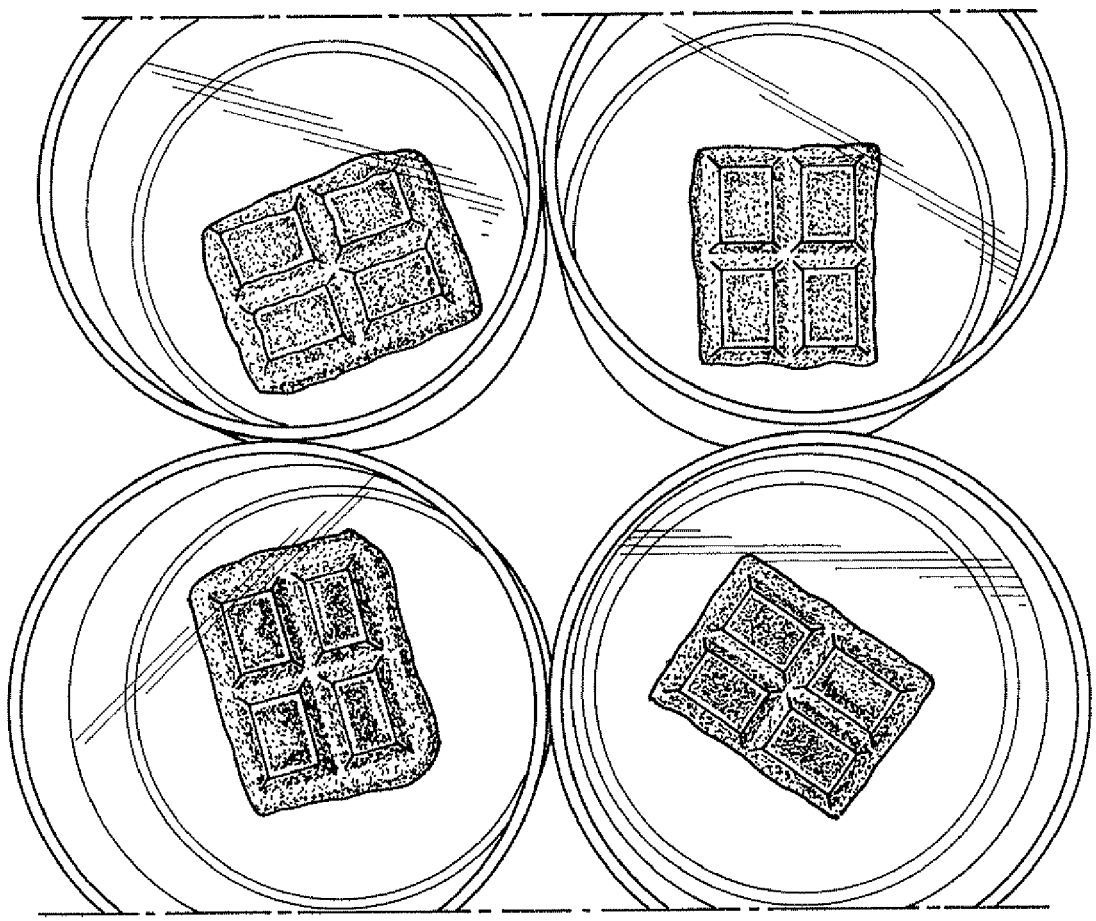
FIG. 4: Shape retention results from Example 4 (the red box indicates the original shape of chocolate pieces—left hand column shows reference samples; right hand column shows IE blends).

The temperature was increased by 1° C. every hour, up to 41° C. Final shape and deformation is recorded (see FIG. 4). It was found that both references were substantially deformed (the milk Brazil reference started to lose its shape at 35° C. and the dark Brazil reference started to lose its shape at 39°

C.). The chocolate produced with interesterified cocoa butter (both dark and milk), on the other hand, only just started to lose its shape at 41° C.

Example 5

Brazilian Cocoa Buffer Melting Point

Chemical interesterification using 0.4% sodium methoxide was carried out for 30 min at 95° C. The slip melting points of the starting material (A), the interesterified cocoa butter (B) and a blend of 10% interesterified cocoa butter with 90% starting material (C) were measured and are given in Table 4.

TABLE 4

| A (ref) | B (IE) | C (Blend) |
| --- | --- | --- |
| 26° C. | 48° C. | 33° C. |

In a separate experiment, blends of cocoa butter (CB) and interesterified cocoa butter (obtained according to the method of Example 1) were made, with the interesterified cocoa butter included at 0, 5, 10, 20, 30 and 100% by weight respectively. Their slip melting points were measured and are given in Table 5.

TABLE 5

| 100% CB | 5/95 | 10/90 | 20/80 | 30/70 | 100% IE |
| --- | --- | --- | --- | --- | --- |
| 26.3 | 27.9 | 32.8 | 36.1 | 37.4 | 45.3 |

Example 6

Gloss and Mouth Feel

A number of sensory tests were carried out. In a first test, a panel of 45 people was asked to evaluate the appearance, and in particular the gloss, of two milk chocolate tablets. The test was carried out blind with A=a standard chocolate containing 100% unmodified cocoa butter and B=a chocolate containing a blend of 10% IE cocoa butter and 90% unmodified cocoa butter. Each panelist was asked to attribute a score out of ten to both products. Both A and B achieved an average score of 6.7 meaning that there was no significant difference in appearance between A and B. In a second test, the same panel was asked to evaluate the mouth-feel (i.e. texture) of the two products. Again, the test was blind with each panelist being asked to attribute a score out of ten. In this test, both A and B achieved an average score of 7.0. There was thus no significant difference in mouth-feel between A and B. Thus, using interesterified cocoa butter allows an increase in heat and bloom stability and increased creaminess without any adverse effect on appearance or overall mouth feel.

Methods

1. Determination of the Slip Melting Point a. Pretreatment of the Cocoa Butter

Dry cocoa butter is melted at 50-60° C. and filtered while hot through a wad of to cotton wool or a fluted filter.

About 50 g of filtered limpid cocoa butter are poured into a 100 ml squat beaker which is immersed in a water bath at 25° C.

The liquid cocoa butter is cooled while stirring constantly until it assumes a pasty consistency. The time required may be quite different from one sample to the other. The inclusion of air bubbles should be avoided during this operation. In no case should seeding crystals (grated cocoa butter) be added.

The beaker with the cocoa butter is then placed in a second water bath at 32-33° C.; the stirring is continued until the sample has the same temperature and changes to a liquid cream consistency, which takes about 30 minutes.

The cocoa butter, which while still being fluid has a milky and creamy aspect, is poured into moulds tempered at 20-22° C. (Napolitains); solidification is allowed to take place for at least 2 hours at room temperature (20-22° C.).

The cocoa butter is removed from the moulds and the melting points determined according to H. Fincke, as follows:

b. Determination of the Melting Points

Press the longer side of a U-tube for melting point (see FIG. 1) into the solidified cocoa butter pretreated according to part (a) to get a 1 cm fat column which has to be pushed down to 1 cm before the bend of the tube with a very fine metal rod.

The shorter sides of two U-tubes containing samples of fat have to be fixed together to a precision thermometer (scale in $1/10°$ C.) by means of a piece of rubber tubing 1 cm long. The bends in the tubes should be at the same level as the thermometer bulb.

Figure 2:
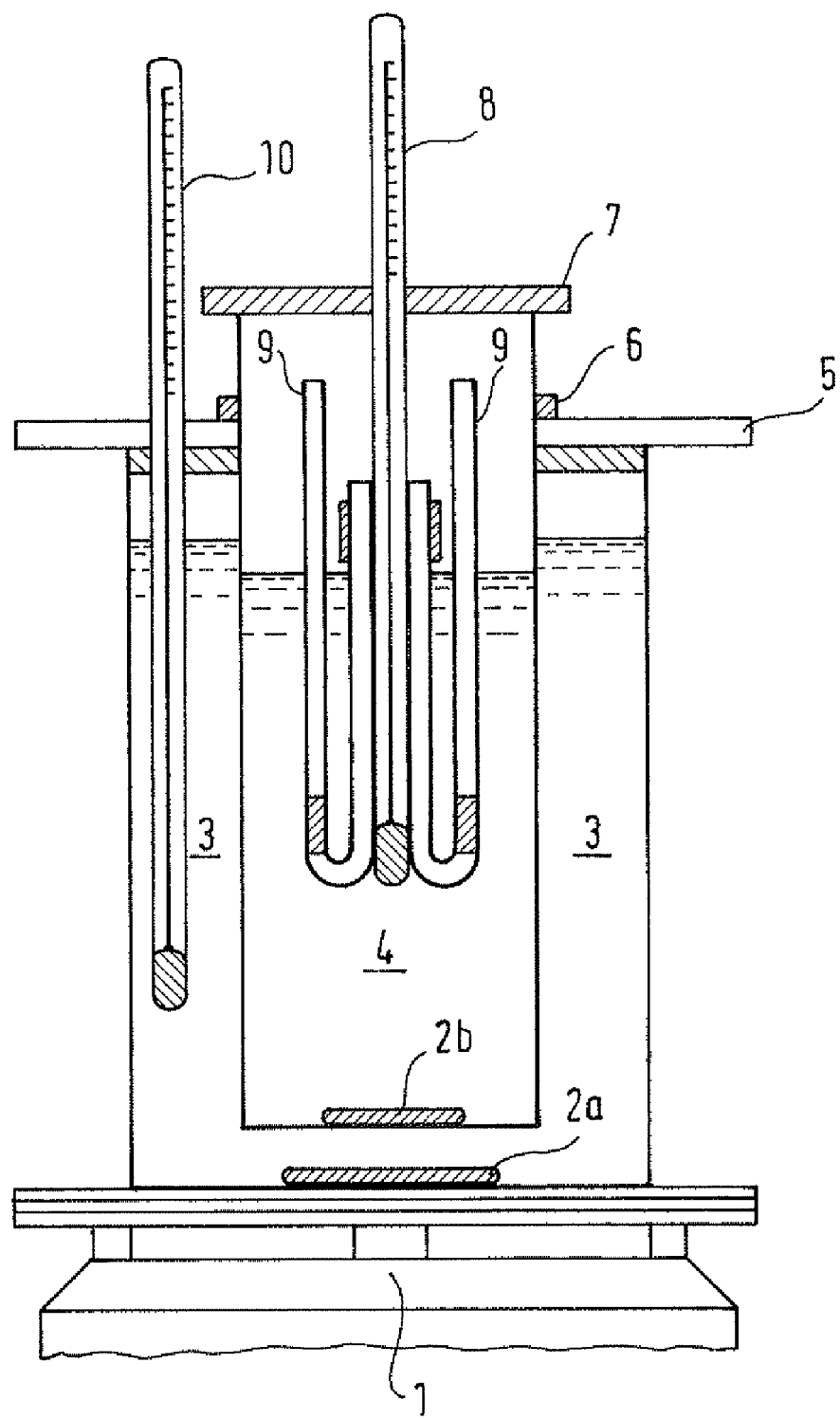
FIG. 2: Equipment configuration for melting point determination (according to Method 1)—Legend: 1=Magnetic stirrer with heating plate; 2a/b=Stirring bars; 3=Exterior water bath; 4=Inner water bath; 5=Plate with two bores for fixation of the inner water bath and a thermometer; 6=Movable rubber ring for adjusting the inner water bath; 7=Rubber plate for covering the inner bath; 8=Thermometer $\frac{1}{10}$° C.; 9=U-tube for melting point according to H. Fincke; 10=Thermometer for the exterior water bath, $\frac{1}{5}$° C.

Introduce the thermometer with the two U-tubes into the inner water bath up til the lower part of the rubber tubing; the level of the inner water bath should also lie 1 cm below the level of the exterior water bath (see FIG. 2).

The exterior water bath is slowly heated under continuous stirring. Care must be taken that the rise in temperature in the inner water bath does not exceed 1° C. per minute up until 4° C. below the probable slip point of the sample to be analysed. The heating should be then be reduced so that the temperature of the inner bath increases by a maximum of 0.2° C. per minute.

The slip point is the temperature at which the fat columns visibly flow towards the bend in the tube.

The temperature of the clear point is reached when the molten fat in the U-part of the tube is completely clear when viewed through a magnifying glass.

2. Chocolate Production

Mixing: Mix the cocoa butter, cocoa liquor, sugar, milk powder, lactose, whey powder and vanilla (as listed in the examples) in a conching machine (water jacket mixer) for 24 hours. At the end of the 24 hours, add the lecithin. Refine the chocolate composition in a ball mill until the particles achieve 25 micrometer.

Tempering: Slowly cool the heated chocolate composition (e.g. coming in at 45° C.) down to 28° C. under high shear. Then slowly increase the temperature to 32° C. to melt out any unstable crystal forms and to form the preferred crystal type. The chocolate composition is liquid and ready to mould. After moulding chocolate is put in a cooling tunnel at 8° C.

The invention claimed is:

1. A chocolate composition having a fat phase, wherein said fat phase:
   has a slip melting point of at least 27.5° C.; and
   comprises both modified and unmodified fats, wherein the unmodified fats comprise cocoa butter and wherein said modified fats comprise an interesterified fat consisting of interesterified cocoa butter.

2. The chocolate composition according to claim 1, wherein the modified fats consist of interesterified cocoa butter.

3. The chocolate composition according to claim 1, wherein the unmodified fats consist of cocoa butter.

4. The chocolate composition according to claim 1, wherein said fat phase consists of interesterified cocoa butter, unmodified cocoa butter and milk fats.

5. The chocolate composition according to claim 1, wherein the interesterified cocoa butter is an enzymatically interesterified cocoa butter.

6. The chocolate composition according to claim 5, wherein the interesterified cocoa butter is interesterified with a lipase enzyme.

7. The chocolate composition according to claim 1, wherein the interesterified cocoa butter is an interesterified and fractionated cocoa butter.

8. The chocolate composition according to claim 1, wherein the interesterified cocoa butter has a melting point of from about 25° C. to 50° C.

9. The chocolate composition according to claim 1, wherein interesterified cocoa butter and unmodified cocoa butter account for 80 to 100% of the fat phase by weight.

10. The chocolate composition according to claim 4, comprising unmodified cocoa butter and modified cocoa butter in a weight ratio of at least 3:1.

11. The chocolate composition according to claim 1, wherein the fat phase comprises of from about 1 to 30% by weight of the interesterified cocoa butter.

12. The chocolate composition according to claim 1, wherein the fat phase comprises of from about 44 to 99% by weight unmodified cocoa butter.

13. A process for the manufacture of a chocolate composition, comprising the step of adding a fat composition to a cocoa liquor, wherein the fat composition comprises at least one modified fat and at least one unmodified fat, said at least one modified fat comprising an interesterified fat consisting of interesterified cocoa butter having a melting point of from about 25° C. to 50° C. and said at least one unmodified fat comprising cocoa butter.

14. The process according to claim 13, wherein the modified fat consists of said interesterified cocoa butter.

15. The process according to claim 13, wherein the interesterified cocoa butter is an interesterified and fractionated cocoa butter.

16. The process according to claim 13, wherein the fat composition consists of interesterified cocoa butter, unmodified cocoa butter and milk fat.

17. The process according to claim 13, further comprising the step of mixing the fat composition and the cocoa liquor in a conching machine.

18. The process according to claim 17, further comprising a tempering step.

19. The chocolate composition according to claim 1, wherein the interesterified cocoa butter has a melting temperature in the range of 30° C. to 45° C.

20. A chocolate composition having a fat phase, wherein said fat phase:
   has a slip melting point of at least 27.5° C.; and
   comprises both modified and unmodified fats, wherein the unmodified fats comprise cocoa butter and wherein said modified fats comprise at least one interesterified fat consisting of interesterified cocoa butter with a melting temperature in the range of 35° C. to 40° C.

21. The chocolate composition according to claim 7, wherein the interesterified cocoa butter is fractionated to remove oleins therefrom.

* * * * *

UNITED STATES PATENT AND TRADEMARK OFFICE
CERTIFICATE OF CORRECTION

| | |
|---|---|
| PATENT NO. | : 8,293,314 B2 |
| APPLICATION NO. | : 12/048581 |
| DATED | : October 23, 2012 |
| INVENTOR(S) | : Falk Bruse et al. |

It is certified that error appears in the above-identified patent and that said Letters Patent is hereby corrected as shown below:

In column 3, line 27, delete "wilt" and insert -- will --, therefor.

In column 7, line 7, below "Example 5" delete "Buffer" and insert -- Butter --, therefor.

In column 7, line 61, delete "to".

Signed and Sealed this
Twenty-second Day of January, 2013

David J. Kappos
*Director of the United States Patent and Trademark Office*